United States Patent
Mathon et al.

(10) Patent No.: US 7,032,005 B2
(45) Date of Patent: Apr. 18, 2006

(54) SYSTEM FOR HANDLING INFORMATION AND INFORMATION TRANSFERS IN A COMPUTER NETWORK

(75) Inventors: John Mathon, Atherton, CA (US); Kannan Ananthanarayanan, Fremont, CA (US); Kayshave Dattatri, San Jose, CA (US); Ganesan Gopal, Alameda, CA (US); Rajiv Maheshwari, Sunnyvale, CA (US); Randy Menna, San Jose, CA (US); Tirumanjanam Rengarajan, San Jose, CA (US); Robert Rightmyer, San Jose, CA (US); Kasi Sankaralingam, Sunnyvale, CA (US); Andre Srinivasan, San Francisco, CA (US)

(73) Assignee: Slam Dunk Networks, Inc., San Mateo, CA (US)

( * ) Notice: Subject to any disclaimer, the term of this patent is extended or adjusted under 35 U.S.C. 154(b) by 647 days.

(21) Appl. No.: 09/740,521

(22) Filed: Dec. 18, 2000

(65) Prior Publication Data

US 2001/0042131 A1 Nov. 15, 2001

Related U.S. Application Data

(60) Provisional application No. 60/199,994, filed on Apr. 14, 2000.

(51) Int. Cl.
*G06F 15/16* (2006.01)

(52) U.S. Cl. .................... 709/206; 709/217; 709/219; 709/238; 709/239

(58) Field of Classification Search ................ 709/201, 709/206, 218, 217, 219, 238, 239; 705/26, 705/28–29, 40
See application file for complete search history.

(56) References Cited

U.S. PATENT DOCUMENTS 5,396,537 A * 3/1995 Schwendeman ........... 340/7.23

(Continued)

FOREIGN PATENT DOCUMENTS

GB 1427319 A * 3/1976

OTHER PUBLICATIONS

Ramanathan, P., "Delivery of Time-Critical Messages Using a Multiple Copy Approach", ACM Trans. on Computer Systems, vol. 10, No. 2, May 1992, pp. 144-166.*

(Continued)

*Primary Examiner*—Frantz B. Jean
(74) *Attorney, Agent, or Firm*—McDermott Will & Emery LLP

(57) ABSTRACT

The present invention relates to relates to the efficient and secure transfer of information over a distributed computer network such as the Internet. The system provides parallel communication paths between the source and destination. Each path includes a dedicated route point to eliminate intermediate ISPs. Each source is associated with an archive and each route point is coupled to the archive. Upon receipt of the message at a route point the message is copied to the archive and then transmitted to the destination. Message archival and storage of transmission-related information enables data-mining features not presently available using email or a point-and-click browser. Since two messages are transmitted from the source to the common destination across separate and distinct communication paths, message latency is improved and the chance of lost messages is reduced or even eliminated. A network controller monitors transmission results and dynamically re-configures the network to balance loading across the route points and to avoid failures or other bottlenecks in the system.

33 Claims, 4 Drawing Sheets

U.S. PATENT DOCUMENTS

| | | | |
|---|---|---|---|
| 5,717,862 A * | 2/1998 | Annapareddy et al. | 709/237 |
| 5,754,754 A * | 5/1998 | Dudley et al. | 714/18 |
| 6,240,552 B1 * | 5/2001 | De Vos et al. | 725/92 |
| 6,401,074 B1 * | 6/2002 | Sleeper | 705/14 |
| 6,466,574 B1 * | 10/2002 | Fujisaki et al. | 370/356 |
| 6,654,726 B1 * | 11/2003 | Hanzek | 705/26 |
| 2002/0002675 A1 * | 1/2002 | Bush | 713/160 |

OTHER PUBLICATIONS

Orda, A., et al., "Routing with Packet Duplication and Elimination in Computer Networks", IEEE Trans. on Communications, vol. 36, No. 7, Jul. 1998, pp. 860-866.*

IBMTDB, Nov 1990, vol. 33, issue 6A, p. No. 29-34. Title: Synchronizing Data on a mirrored IMPL disk Unit.*

* cited by examiner

SYSTEM FOR HANDLING INFORMATION AND INFORMATION TRANSFERS IN A COMPUTER NETWORK

CLAIM OF PRIORITY

This application claims priority from co-pending U.S. Provisional Patent Application No. 60/199,994 filed Apr. 14, 2000 entitled SYSTEM FOR HANDLING INFORMATION AND INFORMATION TRANSFERS IN A COMPUTER NETWORK which is hereby incorporated by reference, as is set forth in full in this document, for all purposes.

BACKGROUND OF THE INVENTION

This invention relates to the transfer of information over a distributed computer network. More particularly, this invention relates to a method and system for reliable and secure commercial communication over the Internet.

In the recent past, the electronic exchange of business information required businesses to establish proprietary electronic document interchanges (EDI) with its trading partners. EDI enables businesses to exchange information regarding common business transactions such as providing catalog information, requesting price quotations from its suppliers, issuing purchase orders and tracking delivery of ordered products. The information is contained in structured documents and is used in a wide range of industries to improve the efficiency of business operation.

Due to the extensive amount of information that must be exchanged, EDI requires reliable transmission infrastructure and robust computer networking capabilities to enable the exchange of vast amounts of information. For this reason it has been common practice to establish dedicated high speed communication links such as a leased T1 line between each trading partner. While such links are reliable and secure, they are also expensive to establish and maintain. Thus, while every business needs to establish EDI relationships with each of their trading partners to improve efficiencies, many small businesses have been unable to do so because of the cost. Indeed, the expense of establishing a T1 line can often run several thousands dollars per month and take many months of effort to set up. Thus, many small businesses are unable to justify the expense of converting from exchanging paper documents using the mail or similar delivery systems. Many small to medium size businesses are typically unable to afford the cost associated with participating in EDI simply because the volume of transactions it has with its trading partners is insufficient to justify the expense. In other instances, businesses do not use EDI because the prior art EDI systems do not readily scale to handle large numbers of participants without investing substantial sums of money to connect all of the business' trading partners. Accordingly, the use of EDI to exchange business documents has been limited to businesses that can justify the expense of maintaining a proprietary computer network between businesses and trading partners. Clearly, what is needed is a reliable, inexpensive system that enables businesses to participate in EDI even at lower volumes.

Further, many businesses have invested substantial sums of money to configure and maintain application programs that enable business to business electronic commerce. These application programs streamline operations relating to supply chain integration. Due to the inherent reliability of such networks, legacy B2B application programs are rarely capable of efficiently dealing with delayed delivery or loss of data in transit. Thus, while the Internet holds promise to lower the cost to participate in EDI, businesses have also been reluctant to port B2B applications to distributed networks because of the lack of control over the data once it leaves a company's proprietary network. This concern arises because data transmitted over the Internet may be lost or delayed in transit for an extended period of time. For example, studies have shown that between four and six percent of the transmissions over the Internet are lost at some point along the Internet transmission path. Many more messages can be delayed for an extended period of time if routed to a web server that is overloaded or that is not operating for a period of time. This inherent lack of reliability creates potential problems for both the data originator and the recipient.

By way of example, if a manufacturer uses an Internet-based EDI system to place an order with a supplier there is no guarantee that the message will not be dropped, lost or delayed for an extended period of time. When this occurs, the supplier will not send a confirmation indicating that the order was received and the manufacturer will be unable to determine if the message is lost or merely delayed. This inherent lack of reliability creates the potential problems for both the message originator and the intended recipient. By way of example, if a buyer issues an electronic order for a million items and the message is not timely delivered the buyer may think that an order has been placed but the seller will be unaware of the order. If the buyer and seller agree that the order is 'lost', a duplicate order could be generated. However, this raises the possibility that duplicate orders are being issued by the buyer and if the lost order is subsequently delivered (that is, delivery is merely delayed and not lost), the seller will receive two orders which is clearly undesirable. Unfortunately, this type of problem is inherent in the distributed nature of the Internet itself. Accordingly, when businesses attempt to port these legacy B2B application programs, to a distributed communication network such as the Internet, it is difficult to verify delivery of the information. This suggests that a mechanism is required to confirm both the transmission and the receipt of information transferred over the Internet. Unfortunately, many legacy B2B application programs designed for proprietary networks are not readily adaptable to respond to transmission related delays or information loss. For this reason both the sender and the recipient need to be able to track the delivery and verify the content of the information.

Even if the legacy B2B application programs are adapted for use with a distributed network environment, they are not well adapted to scaling from hundreds of trading partners to thousands. It is not uncommon for a business to generate hundreds of thousands of transactions in a single day. Thus, whatever system adapted by the business must be capable of scaling to handle millions of transactions on a daily basis. Accordingly, notwithstanding the advantages associated with the prior art EDI systems, a method and system that adapts B2B applications for transmission of valuable business information over the Internet in a secure and reliable manner is needed.

Another problem with using the Internet for EDI is the inherently insecure nature of the transmission. Specifically, information transmitted over the Internet is subject to being intercepted at various hops along the path between the sender of the message and the recipient. Even with encryption technology and secure socket layer (SSL) technology, information transmitted via the Internet is still subject to theft by third parties. Clearly, what is needed is a method and a system that enables the transfer of information over a non-proprietary distributed network, such as the Internet, and that is capable of guaranteeing the secure and timely delivery of messages.

More recently, electronic business transactions have adopted the central portal concept where customers or supplies use their browser to click into web pages resident on a server to transfer electronic data and conduct transactions. This concept works for "click speeds" where the transfer of information occurs in real time. However, the central portal concept does not scale to the environment where business application programs (that is, B2B application programs) operate automatically to transfer information between businesses at high data rates. Further, in the event of dispute, a third party intermediary or other mechanism is required to confirm both the transmission and the receipt of the information transfer as well as the content of the information itself. Accordingly, notwithstanding the advantages associated with the central portal for EDI applications, what is needed is a method and system that handles B2B application programs in a secure and reliable manner comparable to proprietary EDI networks but which readily scales to handle large numbers of participants.

SUMMARY OF THE INVENTION

The present invention provides a system and method allowing businesses to send electronic messages, or other information, to conduct business over a digital network such as the Internet. Aspects of the system provide for a secure transfer of messages, tracking, monitoring, archiving, automated responses, statistics gathering and other features. Software components are used to handle details of the system including message process, message format, message syntax, message semantics, message handling, message interaction and component message interfaces. The system provides for a plurality of route point processors for routing messages independently of the internet service provider (ISPs) routers.

The system uses a virtual private network to provide message delivery within predetermined amounts of time and can provide message latency that is improved over general Internet traffic. Customer-selected security levels can be specified for different types of traffic. Continuous and updated status of the system's network and customer messages is available via a website. Further, the present invention provides an efficient, low-cost system for sending and receiving information over a distributed communication network that avoids the expense associated with proprietary electronic document interchange (EDI) networks. The novel system architecture readily adapts existing EDI networks and business-to-business (B2B) application programs for use over the Internet.

The present invention generates multiple messages and transmits the messages along separate communication backbones. Using the separate backbones, the present invention is able to adapt to unexpectedly high traffic volumes, or outages, on one of the communication backbones. Messages are formed by packaging the information generated by B2B application programs in an extensible markup language (XML) envelope that incorporates the XML structure for routing and enhanced security. XML is a flexible syntax for describing messages so that trading partners may understand each other's data. The XML may also spawn the appropriate B2B application program upon receipt.

The present invention further employs a single point of control to ensure that information is not lost in transit and that the information is delivered to the intended trading partner in a timely manner. The invention delivers messages even if a recipient is temporarily off-line. Advantageously, the present invention eliminates the requirement for legacy EDI/B2B application programs to track and verify delivery of the information to the recipient. These features are enabled by archiving messages at an intermediate point in the transmission path using a unique archival system and method. More specifically, the archival system and method provides a distributed archive that stores messages to guarantee message delivery to the destination, assist in message recovery and retains statistical information regarding the routing and delivery of the messages for subsequent access. The combination of the envelope and archives also provide the trading partners the ability to search, locate and otherwise mine data relating to messages exchanged over an extended time period.

The system provides message delivery within predetermined amounts of time and improves message latency compared to general Internet traffic. Aspects of the system provide for secure transfer of messages, tracking, monitoring, archiving, automated responses, statistics gathering and other features. Customer-selected security levels can be specified for different types of traffic. Continuous and updated status of the system's network and customer messages is available via a website.

One embodiment of the invention provides a system having a plurality of route point processors for routing messages independently of Internet ISP routers and a plurality of connectors. Each connector is responsible for accepting information, preparing the information for transmission over the Internet and establishing the communication link with at least two route point processors. Separate and distinct communication backbones connect each of the route point processors to the connector. Information may be provided to the connector from a B2B application program or by an individual who accesses the system through a web browser. Once information is provided to a connector, it is packaged in an XML envelope to form a message. The envelope identifies the destination and provides routing instructions. Since routing information is specified by the system and included in the envelope, the connector may treat the information received from the B2B application program or the user as an opaque payload which may be encrypted prior to receipt by the connector. After the message is formed, the connector establishes communication links with at least two route point processors and initiates transmission of the message.

Upon receipt of the message, the route point processor retains a copy of the message for archival and attempts to forward the message to the destination. At the destination, another connector establishes a connection to the route point processor via the communication backbone. This connector, the destination connector, is responsible for receiving the message, removing the envelope and passing the information to the B2B application program or user associated with the destination connector. The destination connector is adapted to track the arrival of each message and to eliminate duplicate copies. Thus, even though multiple messages are sent from the source, only one message will be acted upon at the destination. Message replication at the source minimizes transmission latency that could be increased by high traffic volumes or equipment failure along one of the communication backbones.

In addition to improving message latency, error recovery is a significant advantage of the present invention. Specifically, the archived copy of the message may be retained for subsequent delivery if, for some reason, the destination is not accepting messages for an extended period of time. Further, the archived copy of the message may be recovered in the event there is a dispute as to when the message was transmitted by the source connector or received at the destination connector or in the event there is a dispute with respect to the what information was included in the message's payload. Advantageously, the present invention provides a portal that may be used to access the archive using a browser and the Internet.

Another aspect of the invention provides a system for monitoring and adapting the message delivery system to respond to equipment failure or high traffic volumes on the Internet.

DETAILED DESCRIPTION OF A PREFERRED EMBODIMENT

In the following description of a preferred embodiment, reference is made to the accompanying drawings, which form a part hereof, in which is shown by way of illustration specific embodiment in which the invention may be practiced. In the following description, numerous specific details are set forth in order to provide a complete understanding of the present invention. It will be apparent to one skilled in the art that the present invention may be practiced without the specific details. In the development of the actual implementation, numerous implementation-specific decisions must be made to achieve the design goals which will vary for each implementation. Accordingly, in order not to obscure the present invention, well-known structures and techniques are not shown or discussed in detail.

Figure 1:
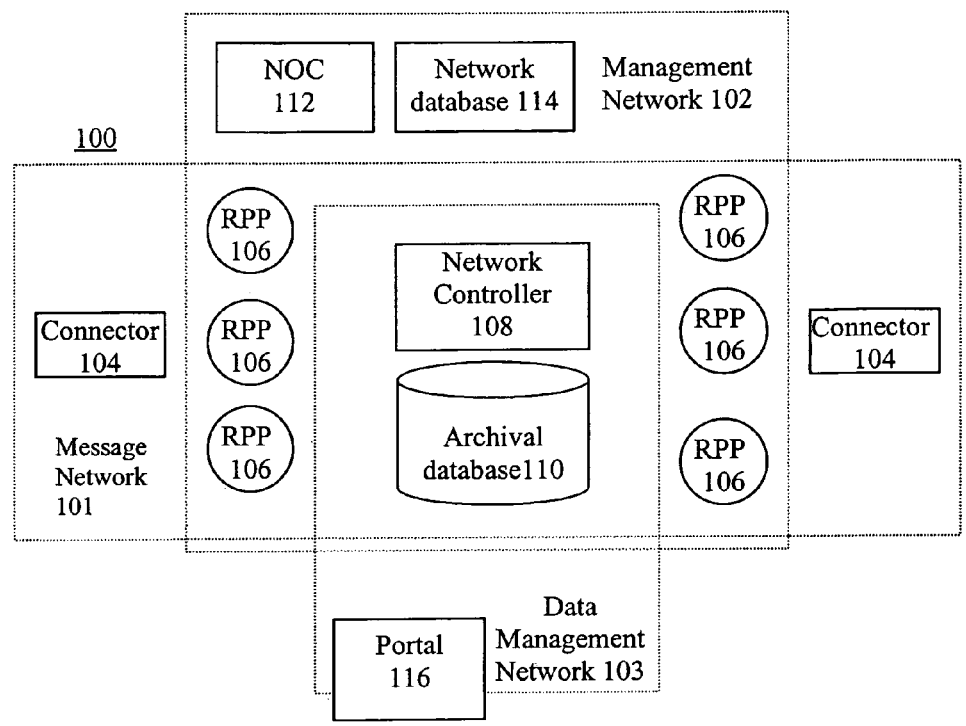
FIG. 1 illustrates the system hardware architecture and the interconnection of the main elements of the present invention.

The present invention relates to a reliable, robust infrastructure directed to the efficient, reliable and secure delivery of information in a timely manner across the Internet. Referring now to FIG. 1, the topology of a preferred embodiment of network 100 is shown. In this embodiment, the network is partitioned into three virtual networks referred to as message delivery network 101, management network 102, and data management network 103. The message delivery network employs logical and physical components referred to as connectors, route point processors and archives to move messages from the source to the destination.

The management network 102, which monitors and manages operational features of network components, comprises a network operations center (NOC) 112 and a network database 114. The dotted lines in FIG. 1 are used to show the logical configuration of the networks and how various components are associated with different networks depending on the particular function being performed. The overlap of the networks is illustrated with reference to management network 102 where NOC 112 dedicated to monitoring the physical status of the respective components and the communication backbone of message delivery network 101. When NOC is notified of a problem, alert messages are transmitted to network managers or other personnel responsible for maintaining the network system. The alert message is transmitted either by e-mail, fax, telephone, pager, or other communication means such that appropriate personnel and repair equipment are timely dispatched to correct the problem. NOC 112 employs commercially available network management tools, to remotely identify and correct the cause of the problem. Network controller 108 and NOC 112 utilize a shared network database 114 to exchange status information regarding the operational status of the network.

Data management network 103 provides a user having appropriate security access to query archival database 110 for data mining and monitoring performance parameters of message network 101. As with management network 102, data management network 103 encompasses portions of the message network 101 and more specifically, route point processors 106, network controller 108, and archival database 110. Data management network 103 further includes a portal 116. Portal 116 enables end-users or application programs to access the data stored in archival database 110 to provide accounting, configuration, and performance information, as well as other value-added services which may be accessed through the API defined by portal 116. Access to the archive database is obtained through a data management network which defines a common API access through a portal. The portal access provides an opportunity for off-line analysis and enables the user to regenerate or to define alternative databases conveying various levels of information and functionality.

Message delivery network 101 includes a plurality of connectors 104 through which B2B/EDI applications or users gain access to the message delivery network. Although only two connectors 104 are illustrated in FIG. 1, it should be apparent to one skilled in the art that the numbers of connectors is not limited because the connectors are software components that may populate any end user or application server.

Each connector 104 provides the necessary interface between the message delivery network 101 and the respective source and destination application or user. More specifically, connectors are the main workhorses of message delivery network 101. Each connector is responsible for encryption, compression, XML packaging, address resolution, duplicate message filtering and error recovery.

Figure 2A:
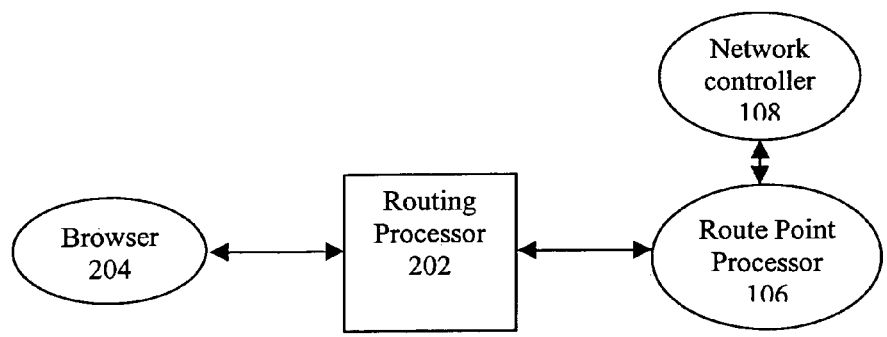
FIG. 2A illustrates a standalone connector that provides user access to the system environment of the present invention from a browser via an Internet connection.

A portion of connectors 104 distributed throughout message network 101 may be deployed as standalone connectors which are illustrated in FIG. 2A. Standalone connectors are either client based or network based, operate outside B2B/EDI system environments and provide connection to message network 101 from any browser via an Internet connection. Standalone connectors comprise a software module referred to as a routing processor 202 which contains the logic necessary to interface to message network 101. The primary responsibility of routing processor 202 is to establish connection with selected route point processors 106 in accordance with network configuration data obtained from network controller 108.

Client based connectors are similar to standalone connectors except they are deployed either on the same computer platform as the B2B/EDI system or on a separate computer platform at a customer data center and linked to the B2B/EDI system via a local network. Client based connectors may be either behind of or in front of a firewall.

Network based connectors are always deployed on the Internet within the message network 101. A network connector appears to the outside world as a web proxy but only functions to deliver messages over message network 101. Network based connectors provide for a zero footprint at the customer site, although minor configuration modifications to any B2B/EDI system used at the customer site may be required to establish a communication link to the connector. Such configuration modifications are implementation-specific and not further discussed herein.

Figure 2B:
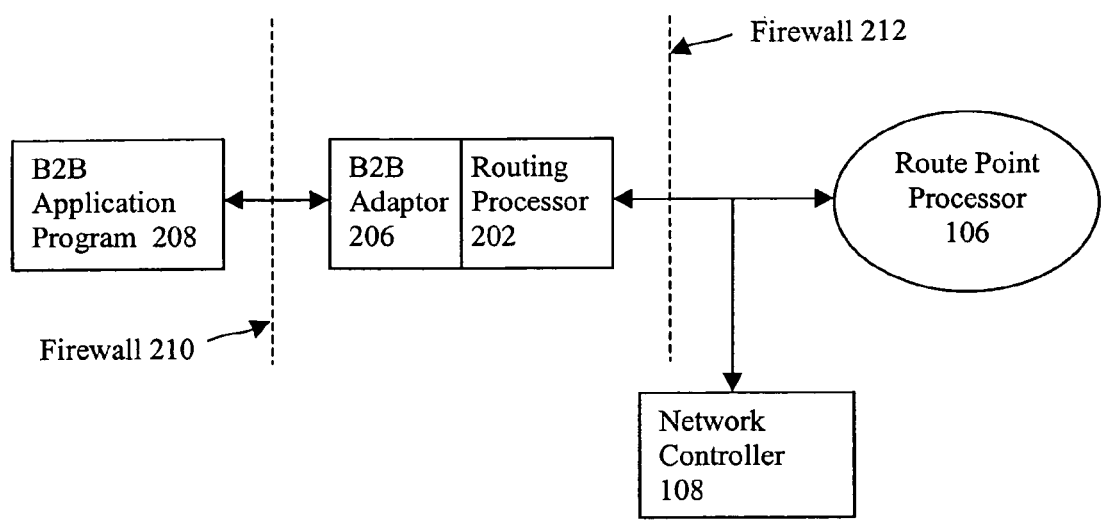
FIG. 2B illustrates an embedded connector integrated with a commercially available B2B/EAI application.

Alternatively, connectors 104 are deployed as embedded connectors which are integrated with one of the commercially available B2B/EDI application as illustrated in FIG. 2B. Embedded connectors are either tightly integrated with specific vendors B2B/EDI applications or a module having the appropriate application program interface (API) that plugs into a third-party B2B/EDI application. Again, the integration of the connector with application 208 or the specific API are considered implementation-specific and are not further discussed herein. Embedded connectors are typically deployed on the same computer platform that hosts the B2B/EDI application.

In one preferred embodiment, embedded connectors include the routing processor 202 and an adaptor 206. Adaptor 206 is B2B/EDI application specific and is customized to interface with the API of a selected application 208. Adaptor 206 may be a Java object specifically programmed to handle the transfer of data to and from application 208 and to establish a connection through intervening firewall 210, if present. The primary function of adaptor 206 is to translate information from an application generator and convert it to a standard HTTP protocol message. As should be understood by one skilled in the art, the message provided to adaptor 206 is an opaque object payload since the present system does not require any knowledge regarding the content of the payload other than the deliver address and delivery priority. Accordingly, the payload information may be encrypted for security. The routing processor 202 associated with each embedded connector functions as an HTTP proxy interface for the application generator 208 establishing contact with specified route point processors 106.

If an intervening firewall 212 is present, routing processor 202 is responsible for establishing and maintaining the connections through the firewall. Once the payload is obtained from the application generator 208, the payload is presented to routing processor 202 where it is packaged in a delivery envelope. Specifically, the payload is inserted into an XML envelope and associated with an address, a priority transmission level and a tracking number. At that point in time, the XML package is ready for transmission. However, the user may specify that routing processor 202 encrypt the XML package so that the address, priority and tracking information is wrapped in an encrypted format and, thereby, further hidden from potential hackers or snoopers who have unauthorized access to the transmission network. Application 208 may further include external messages with the payload that are not encrypted or, alternatively, the entire payload may be encrypted to provide enhanced security for the message when its transmitted over the transmission network. The only requirement for the payload is that it be provided to the routing processor 202 with the address of the recipient and the transmission priority.

In one preferred embodiment, routing processor 202 is a Java object having the function that enables communication between the connector and the network controller 108. This connection may be through an outgoing firewall so routing processor 202 acts as a browser establishing a connection via an Internet or similar communication to network controller 108. Information from the network controller is pushed back to the routing processor through any intervening firewall in response to a browser request. In this manner, configuration information regarding transmission paths (specific communication backbone), route point processors, and archives associated with the connector is transmitted from the network controller to the routing processor. Once the configuration information is obtained, routing processor functions in an independent manner to establish contact with specified route point processors 106. When a message is received at routing processor 202 an XML envelope is applied and a connection with at least two route point processors 106 using the specified communication backbones are established. Routing processor 202 then prepares two XML envelope messages for transmission. One message is logically designated as the primary message. The other message is logically designated as the secondary message. Both messages are identical, except, however, each message will be sent along a different communication backbone to separate route point processors. In this manner, if one transmission network is slow due to high volume of traffic or is experiencing transmission delays or disconnection problems, the other message will be routed along a communication backbone that will avoid such delays.

In the event B2B application program 208 does not require access to connector 104, adaptor 206 may be bypassed and access provided to routing processor 202 through any web browser. As in the case of the network connector, routing processor 202 appears as an HTTP proxy interface for the user using the web browser. Accordingly, the present invention easily adapts existing EDI applications in a manner that enables secure transmission of messages across the Internet and that guarantees message delivery. With the addition of the archival of messages and transmission receipts, the present system provides trading partners the ability to track message transmission receipt delivery time, as well as to obtain convenient archival of messages with the trading partners as described more fully below.

Messages are formed by packaging business information in an extensible markup language (XML) wrapper. The message provides a structure that incorporates XML instructions and protocol for routing, security and processing with the business information carried in the envelope as an opaque payload to the recipient. As is understood in the art, XML provides a flexible syntax for routing the message to the recipient trading partner. Further, the XML envelope enables the business information to be extracted by the recipient and is capable of triggering events on its own. In this manner, the message is capable of conveying information necessary to find the appropriate application programs at the recipient and conveying status information for the B2B application program.

Each message includes a message sequence number tag, a source designation, a destination designation. a message size number and date and time the message was generated. This information is used in routing the message from the source to the destination At the route point processor, the header is modified to include a forwarder designation and the time the message is received. The header may also include user-specific information such as name of the originator, keywords or subject matter description of the payload that will be useful for data-mining functions. The payload consists of the B2B information.

When the messages involve financial or other valuable and proprietary information, security is of paramount concern. In the present invention security is employed in a hierarchical manner. At a hardware level, the path a message must take to get from a source connector to a destination connector is along a secure virtual private network transmission path. Security is further enhanced by establishing a secure socket layer (SSL) protected connection between each connector and respective route point processors. At the software level, the connector is responsible for generating an encrypted envelope around the message. Since connectors 104 are the entrance to the message network 101, responsibility for data security starts with the user interface which is responsible for authenticating the user and determining whether the user will have access to delivered messages or be authorized to send messages. The following table summarizes additional security protocol available for the various connector types and deployment options supported by message network 101:

| Connector Type | Availability Restrictions | End to End Privacy | Authentication | Non-Repudiation |
|---|---|---|---|---|
| Embedded | B2B System | Message Envelope | Yes | Yes |
| Standalone Client Based Behind Firewall | Proxy support needed | Message Envelope | Yes | Yes |
| Standalone: Client Based Outside Firewall/DMZ | Proxy support needed | Chained-SSL Envelope Optional | Optional | Optional |
| Standalone: Network Based | None | Chained-SSL only Envelope Optional | No | No |

As noted above, network 100 further comprises a plurality of route point processors 106. Route point processors 106 form the backbone of the three virtual networks. Route point processors 106 are Internet-based message engines serving several specific functions. Each route point processor 106 is a dedicated hardware resource such as a network server or other computing device capable of accepting multiple connections and handling multiple threads. Route point processors 106 act as a route point between connectors 104. Route points allow messages to be delivered to the selected destination along Internet segments selected by the network controller 108 rather than the intervening ISP's routers. Route point processors 106 serve as firewall proxies for network 100. By acting as a route point, route point processors 106 deliver messages to the specified connector without requiring inward connections that would otherwise pierce a firewall erected between the connector and the network environment. When a connector wishes to establish a socket connection with a selected route point processor, the route point processor will accept the incoming connection even though the connector may be positioned behind the firewall. A socket connection is a virtual connection between processes using Unix's standard I/O over network communication facilities The route point processor then works in conjunction with the connector to keep the socket connection alive. This socket connection is also used to deliver inbound messages to the connector from the route point processor.

Route point processors 106 also serve as archive points since each interfaces directly with archive 110 to duplicate and redirect data messages received from a connector for archival storage in archival database 110. This duplication and redirection process is performed transparently to the connector. With the archival copy, delivery of the data message to the destination connector becomes the responsibility of the route point processor even if the destination connector is down or otherwise not accepting messages at that time. By virtue of having archived the message, route point processor 106 may send the message to the destination whenever the destination connector is ready. The combination of the route point processor and archival database 110 enables transport level acknowledgments to be used as the protocol between a source connector and the route point processor to establish proof of delivery even if the destination connector is not functioning at the time the data message is sent.

Although only six route point processors are illustrated in FIG. 1, the number may be readily increased as the number of users and messages increase. Each route point processor includes a process running on a network server computer coupled to the Internet or other communication system. Each route point processor functions as a route point along a separate and distinct communication backbone. As used herein the communication backbone is defined as the top level in a hierarchical network and consists of high_speed links in the T1 (e.g. a digital carrier facility used to transmit a DS1 formatted digital signal at high data rates), T3 (e.g., a digital carrier facility used to transmit a DS3 formatted digital signal ), OC1 (e.g., a broadband networking standard based on point_to_point optical fiber networks providing a high_bandwidth "pipe" to support ATM_based services) and OC3 ranges. The topology of each backbone provides many paths. Thus, message paths may be routed independently of any problem on a particular communication backbone.

Network 100 further includes a network controller 108 that is responsible for managing connections between connectors and route point processors. Conceptually, network controller 108 is accessible from the message network 101, the data management network 102 or the management network 103. Network controller 108 primary task is load balancing message traffic so that connectors are not routed to route point processors having high message traffic. Load balancing seeks to minimize transit time for each message. Both connectors and route point processors can pull information from network controller 108. This information assists in the recovery of undelivered messages, message tracking or identifying system bottlenecks and re-configuring network topology. When it is necessary to update routing configuration or otherwise update connector and route point processor, network controller 108 pushes information directly to the selected route point processor. Any information sent by network controller 108 to a connector must be routed through a route point processor.

Network controller 108 is associated with a network database 114 where information relating to the real-time operation of network 100 is maintained. Network controller 108 has the responsibility for configuring the interconnections between connectors and route point processors to optimize network operation. Network controller 108 must also re-configure operation of the network in response to occurrence of events or alerts discovered by NOC 112 as explained in more detail below.

In addition to connectors 104, route point processors 106 and network controller 108, message network 101 also includes a redundant, fault-tolerant distributed archival database 110 that serves as a message repository. Physical components of archival database 110 such as disk drives and controllers are geographically distributed throughout the message network 101 and are coupled to the communication backbone through route point processors 106. In one preferred embodiment, archival database 110 comprises sets of independent databases that are partitioned and dedicated on a "per connector" basis. Archival database 110 is a write-mostly database, but is accessed in conjunction with message recovery algorithms, reporting and data mining operations.

In addition to message network 101, network 100 includes a management network 102 that is directed to monitoring operation of the message network 101. Management network 102 functions include algorithms to monitor and minimizing message transmission latency and to provide access to various points of the network for troubleshooting network components when error conditions or other problems (alerts) or events (request for service) are encountered. Accordingly, management network 102 encompasses portions of message network 101. Specifically, management network 102 is coupled to connectors 104 not protected behind a firewall, route point processors 106, archives 110, and network controller 108. Management network 102 further includes a network operations center (NOC) 112 that is responsible for the real-time performance monitoring and management of the hardware components of the above-described components of the message delivery network 101. Further NOC 112 shares access to network database 114 with network controller 108. Network database 114 maintains information relating to the real-time operation of network 100 so NOC 112 is responsible for flagging any non-functional component of message network 101. Network controller 108 has the responsibility for re-configuring operation of message network 101 in response to occurrence of events or alerts discovered by NOC 112. Shared access to database 114 enables rapid response to network problems. In general, any information generated across message network 101 that is not stored in archival database 110 will be assigned to NOC 112 for appropriate response. In one preferred embodiment, NOC 112 enables a system administrator to override any connecting or routing information selected by network controller 108.

Network 100 further includes a data management network 103 that provides a user with appropriate security access to query archival database 110 for data mining and monitoring message network 101 from a user's perspective. As with management network 102, data management network 103 encompasses portions of the message network 101 and more specifically, route point processors 106, network controller 108, and archival database 110. Data management network 103 further includes a portal 116. Portal 116 enables end-users or application programs to access the data stored in archival database 110 to provide accounting, configuration, and performance information, as well as other value-added services which may be accessed through the API defined by portal 116.

Figure 3:
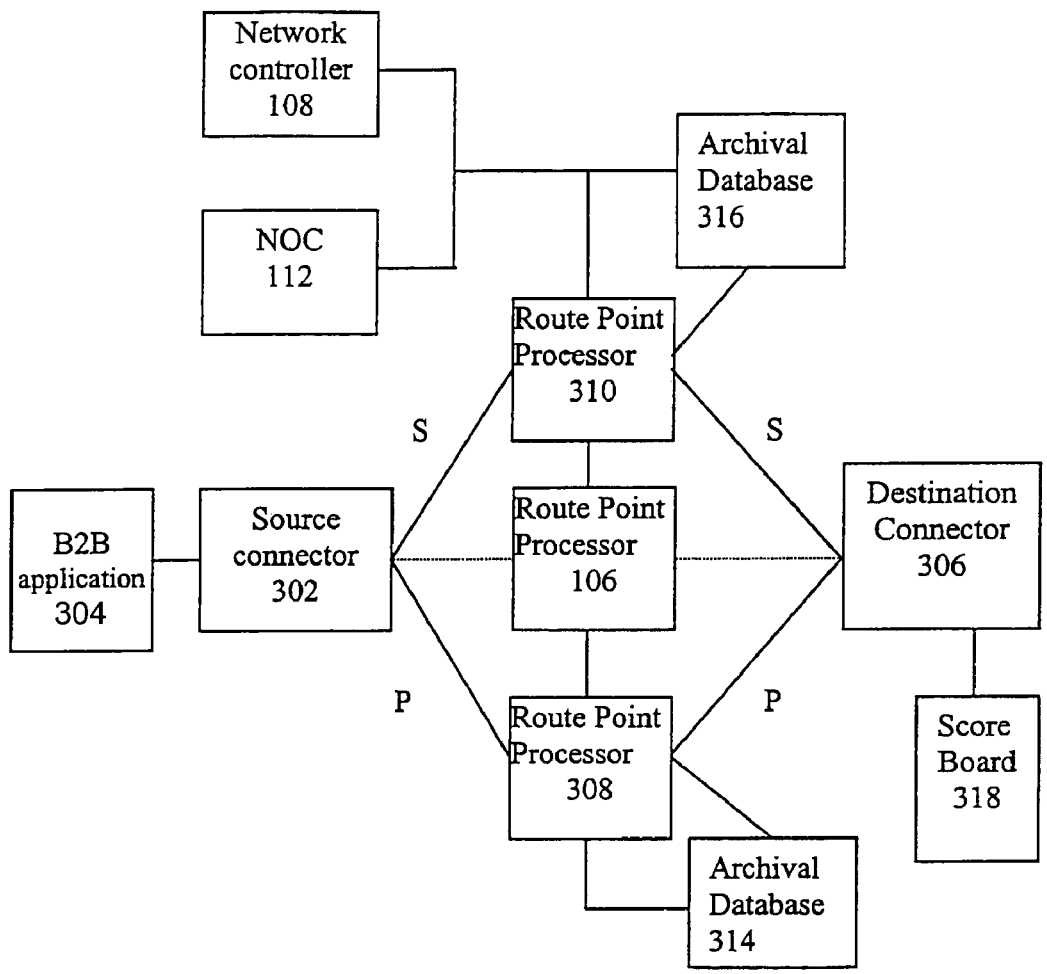
FIG. 3 is a simplified illustration of the interconnection of the elements of the present invention.

Referring now to FIG. 3, a simplified illustration of the system of FIG. 1 is shown for purposes of describing the operation of the present invention. In this embodiment, a source connector 302 is shown receiving information from a B2B/EDI application 304. Information is transferred from application 304 to source connector 302 where the information is packaged in an XML envelope containing transmission routing information to form a message. This message is a self_contained, independent entity of data carrying sufficient information to be routed from the source connector to a destination connector 306 without reliance on earlier exchanges between this source connector and destination connector and the transporting network. Source connector 302 then transmits the message to at least two route point processors 308 and 310 each of which is associated with a separate and distinct communication backbone. One message is designated as the primary message and the other message is designated the secondary message. The backbone that carries the primary message is referred to as the primary path and the route point processor is referred to as the primary route point processor. Similarly, the other backbone and route point processor are referred to as the secondary backbone and route point processor. Advantageously, only one route point processor is positioned between the source and destination connectors in the preferred embodiment of the present invention.

In the following discussion, the message sent to route point processor 308 will be referred to as the primary message and route point processor 308 will be referred to as the primary route point processor. Similarly, the segment of the primary communication backbone connecting source connector 302 to route point processor 310 is designated by the letter P in FIG. 3. It will be appreciated that such designation is determined by network controller 108 but in this example it is so designated solely for clarity in the following description. It will further be appreciated that route point processor 310 will accordingly be referred to hereafter as the secondary route point processor and the corresponding segment of communication backbone connecting source connector 302 to route point processor 310 is designated by the letter S. The primary and secondary messages are companion messages and the designations are not intended to imply that the messages are ranked.

When the primary message arrives at route point processor 308, acknowledgement is sent by the primary route point processor 308 to source connector 302 indicating receipt of the primary message. Similarly, receipt of the secondary message is acknowledged by the secondary route point processor 310. Once receipt is acknowledged, each route point processor sends a confirmation to the source connector and then replicates the message and sends one to the archive. The primary route point processor sends the replicated message to the primary archival database 314 and the secondary route point processor sends its replicated message to secondary archival database 316. Each route point processor also attempts to independently transmit the message to the destination connector 306, again along separate and distinct communication backbones. While it is clearly feasible to utilize merely a single communication backbone and route point processor to complete the transmission of a message from the source to the destination connector, such a configuration would be inherently unreliable as will be explained in greater detail below. To both guarantee delivery and minimize the time to complete the delivery, the present system and method invokes separate and distinct transmission paths, duplication of messages and duplication of system components while sacrificing the expense associated with the increased usage of available bandwidth.

In order to insure that messages may be recovered in the event destination connector 306 is unable to receive a message or is otherwise non-functional for an extended period of time, the archive copy of the message provides a redundant cache from which the message may be recovered when the destination connector is again operational. In addition to message archival, archives 314 and 316 also maintain information related to transmission routing and tracking information necessary to insure complete recovery in the event destination connector 306 is unable to receive the message for an extended period of time.

To assist in the recovery of undelivered, each destination connector is associated with a scoreboard 318 that tracks delivery of each message. In operation, each message received by destination connector 306 from connector 302 is sequentially added to scoreboard 318 upon receipt. Scoreboard also tracks whether both the primary and the secondary message have arrived.

Periodically, destination connector 306 checks scoreboard 318. When destination connector 306 finds a gap in the sequential list of messages received from source connector 302, destination connector 306 establishes a communication link with any route point processor in the network such as route point processor 106 or route point processor 308, by way of example. Destination connector 306 then requests transmission of the missing message or messages from the primary and/or the secondary archival database 314 or 316, respectively. Since destination connector 306 maintains an ordered list of messages received from each source connector 302, it is able to determine if any message sent by source connector 302 has been "lost." Lost messages are then obtained from archives 312 or 314 merely by having destination connector 306 issue a request for the missing message from the archives. If the primary archival database 314 is down, the message is recovered from the secondary archival database 316.

Figure 4:
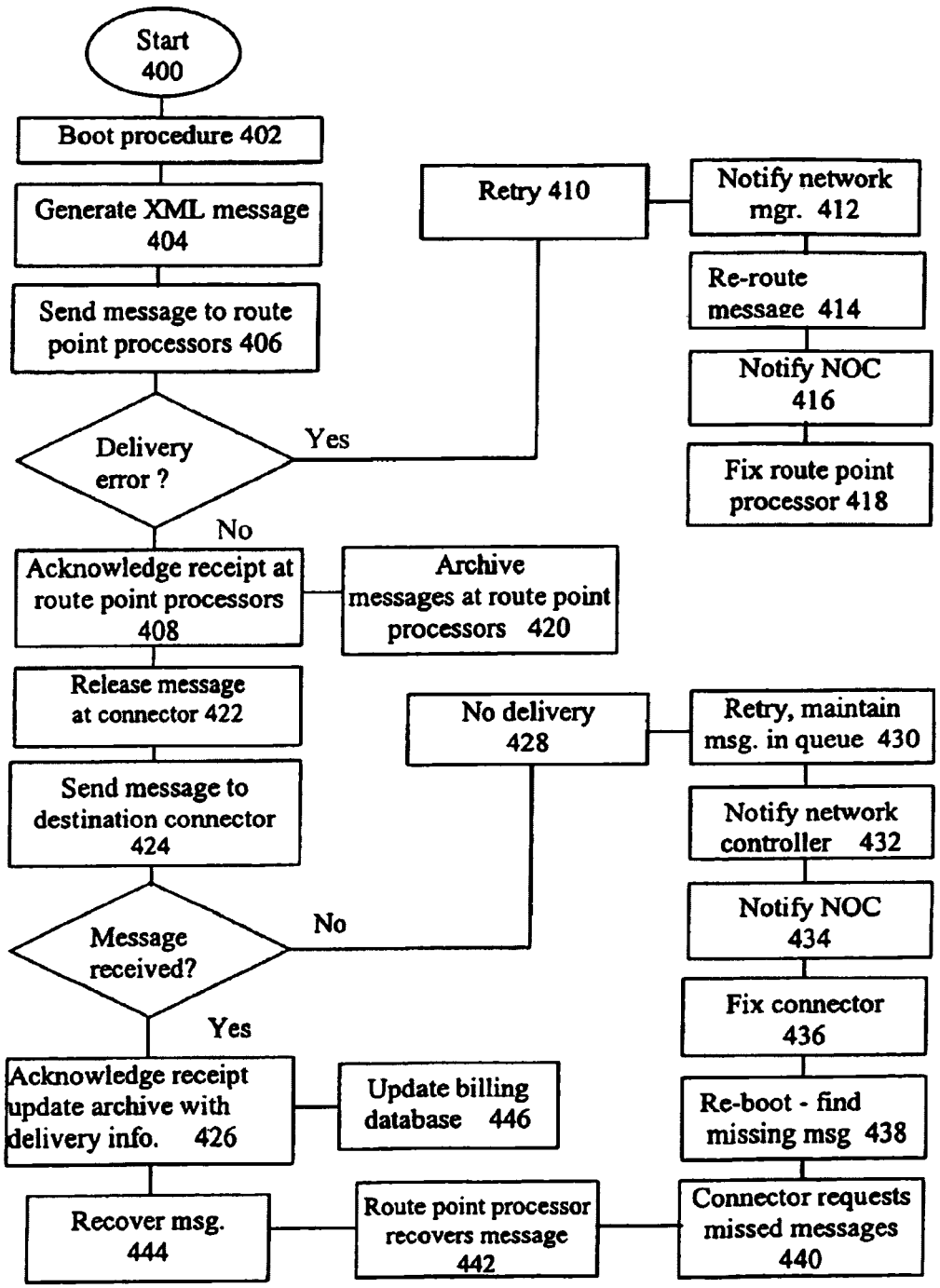
FIG. 4 is a flow diagram illustrating the processing logic of the present invention

A more detailed explanation of the operation of the embodiment shown in FIG. 3 is described in conjunction with the flow diagram of FIG. 4. Preliminarily to operation of the system or a component of the system, a boot up procedure is invoked. Whenever a connector, a route point processor, or an archive comes on-line it initiates boot procedure 402. Boot procedure 402 requires each component to register with network controller 108 at which time network controller 108 transmits specific information regarding the network topology. Also, during the boot procedure, connectors are assigned to a primary and secondary route point processor and are provided connection and routing information. Network controller 108 identifies the primary and secondary route point processors based on current and anticipated loading on the communication network. Network controller 108 also assigns the primary and secondary archives associated with each connector and initializes scoreboard counters since each connector may function as either a source connector as well as a destination connector. Using this information, source connector 302 identifies the primary and secondary route point processors to contact for transmission of the message. Further, source connectors can, at any point in time, communicate with network controller 108 or NOC 112 through the assigned route point processors to transmit either logical or physical problems encountered during a transmission session.

After boot procedure 402 is complete, each component remains idle until a message needs to be sent from a source to a destination. Information generated by a B2B application program or a user is provided to source connector 302. Upon receipt of the information, source connector 302 places the information in an XML envelope to form a message as shown in step 404. This message contains information regarding the destination connector 306, the time the message was generated. The source connector may optionally encrypt both the transmission information as well as the underlying information in the XML envelope. Once source connector 302 has generated the message, it establishes a transmission path to the pre-selected primary and secondary route point processors. By way of example using the embodiment of FIG. 3, source connector 302 establishes a first transmission path with route point processor 308 and a second transmission path to route point processor 310. Then, as indicated at step 406, source connector 302 generates at least two messages to be sent along the respective message paths to route point processors 308 and 310. During this process, source connector 302 retains a copy of the message and the information provided by the application 208 or the user. This information is retained until source connector 302 receives acknowledgment of message receipt at the respective route point processors, as indicated at step 408.

If, however, source connector 302 is unable to confirm receipt at one or both of the route point processors, source connector 302 will intermittently attempt to re-transmit the information to the route point processors, as indicated at step 410. If source connector 302 is unable to establish communication with one or both route point processors, source connector 302 then notifies network controller 108, as indicated at step 412. Upon notification to network controller 108 that the message is unable to be sent along the pre-selected communication backbones to one or both route point processors, network controller 108 may transmit new routing information to source connector 302, as indicated at step 414.

Source connector 302 also notifies NOC 112 of the failure to transmit the message to the route point processor as indicated at step 416 using an embedded agent software program that functions to provide an indication of the problem encountered. NOC is a centralized control center dedicated to monitoring the physical status of the respective components and the communication backbone of the transmission network. When NOC is notified of a problem, alert messages are transmitted to network managers or other personnel responsible for maintaining the system. The alert message is transmitted either by e-mail, fax, telephone, pager, or other communication means such that appropriate personnel and repair equipment are dispatched. Using commercially available network management tools, troubleshooting activity can be employed to identify and correct the cause of the failure as indicated at step 418. Network controller 108 and NOC 112 utilize the shared network database 114 (see FIG. 1) to exchange status information regarding the operational status of the network.

With new routing instructions obtained from network manager 108, source connector 302 attempts to establish a new connection with the newly identified route point processor (with reference again to FIG. 3, by way of example, route point processor 106) and transmits the message. The receiving route point processor (either route point processor 308, route point processor 310, and/or route point processor 106) archives the message in the associated archival distributed storage database, such as indicated at step 408. Upon receipt of the message at route point processor 106 and a successful archival of the message, an acknowledgment of receipt is sent back to source connector 302 as indicated at step 420. When both the primary and secondary route point processor acknowledge receipt, source connector 302 may discard its copy of the message and proceed with other tasks. These tasks may include releasing the connection to application generator or the user 304 from the source connector 302 as indicated at step 422. Once each route point processor has archived the message, the receiving route point processors transmit the message from the route point processor to the targeted destination connector, as indicated at step 424.

Based on the above described operation of the present system, it should be understood that two duplicate messages are sent to each of the route point processors along separate transmission paths. Further, each message is archived in an archival database associated with each of the route point processors. Accordingly, it should further be apparent that two archived messages will be retained. As a practical matter, one of the messages sent from the source connector to one of the route point processors will be designated as the primary message. This message will be stored in an archival database that is designated as primary archival database 314. The second message sent from the source connector to the other route point processor will be referred to as the secondary message. It is transmitted along a different communication backbone to a secondary route point processor where it is archived in a secondary archival database 316. It should be understood that the primary and secondary designations are arbitrary and assigned merely for convenience. In the event that one of the transmission path, route point processor and/or archive were to fail due to a physical or logical problem, any message may be readily acquired from the other archive along the other transmission path. The duplicate transmission of messages from source connector and the duplicate archival of messages provides a redundant fault tolerant system that ensures the delivery of the message to the destination even if there is a failure or delay in the delivery process. For this reason, once the message is archived, each route point processor transmits an acknowledgment to the source connector and assumes responsibility for delivery of the message. The source connector is then free to engage in other tasks.

Each route point processor attempts to transmit the message to destination connector 206, if possible. If the destination connector is not active, messages are retained in the archive until such time as the destination connector is again available. Upon receipt of the primary message at destination connector 206, a confirmation acknowledgment is sent to the primary route point processor. Another confirmation is sent to the secondary connector upon receipt of the secondary message. Each route point processor then writes the receipt confirmation to the respective archival database with additional delivery-related information indicating the time and date of the delivery. Further, each route point processor periodically transfers a summary record to network controller 108 specifying the number of messages received from the source connector and delivered to the destination connector.

At the destination, destination connector 206 checks scoreboard 318 to determine whether the message sequence number associated with the message has been previously recorded. If the message has not been received, the destination connector updates scoreboard 318 to indicate receipt of that specific message and XML code activates the appropriate B2B application program and the opaque information is provided thereto. If one of the messages has already been received, destination connector will not transmit the subsequently received (that is the second to arrive) message to the B2B application program or the user associated with the destination connector 206.

If, however, destination connector is non-responding and neither route point processor can complete transmission, an error condition is encountered. In the event of such an error, both the primary and secondary route point processor will be unable to deliver to the destination connector, as indicated at step 428. Each route point processor is programmed to intermittently re-try, as indicated at step 430. During the attempts to re-transmit the message from the primary and secondary route point processors to the destination connector 306, messages will be maintained in a message queue at the respective route point processor. Further, both the primary and secondary route point processors will notify the network controller 108, as indicated at step 432, indicating that it is impossible to establish a transmission path to the destination connector 306. At that point, NOC 112 is also notified and the appropriate field service personnel are dispatched to determine the source of the problem, as indicated at step 434. As indicated at step 436, the failure mode associated with the destination connector is corrected and brought back online.

When the destination connector is again operational, destination connector 306 registers with network controller 108 informing it that it is again on-line and available to receive messages. As part of the communication process associated with re-booting, destination connector will obtain information from network controller 108 regarding any messages that may have been missed during the non-operational time period, as shown at step 438. Network controller 108 transmits to destination connector 306 information packets describing message transmission information. Such information will include the source of the message, the time it was sent, and a sequential message number. This information is received by destination connector 306 and stored in scoreboard 318. Subsequently, destination connector 306 establishes a connection with any available route point processor in the network system, as indicated at step 440. Destination connector then uses information obtained from the network controller information packets to request specific messages currently being retained in the primary and secondary archives.

As indicated at step 442, the route point processor receiving destination connector's request establishes a connection to the indicated primary and/or secondary archives to recover the specific message. Once the message is recovered from the archive, the route point processor transmits the message to the destination connector, as indicated at step 444. Upon receipt of the recovered message, an acknowledgment is sent from the destination connector 306 to the route point processor indicating receipt of the information. and the process flow returns to step 426, where the route point processor receiving an acknowledgment updates the primary and secondary archives, indicating that the message has been delivered. This update process includes the time and date that the message was delivered so that statistical tracking information is available for data mining applications.

After acknowledgment receipt, destination connector 306 verifies that the message has not previously been received. Destination connector 306 does this by checking scoreboard 318 to determine whether the message sequence number associated with the message has been previously recorded. If the message has not been received, the destination connector updates scoreboard 318 to indicate receipt of that specific message. If the duplicate message is subsequently received, destination connector will determine if this message has already been received via the other transmission path and whether this second to arrive message needs to be transmitted to the B2B application program or the user associated with the destination connector 306.

Upon receipt of the message, the archives contain the following: the source of the message, the time sent, the transmission paths along which the primary and secondary messages are sent, the date and time of receipt. That information, together with the information provided by B2B application program 208 and contained in the XML envelop, is retained in a secondary or tertiary (i.e., off-line) archive in a manner well understood in the art. Thus, in the event that there is a dispute as to the receipt or the content of the information, the current system provides a third-party disinterested entity that is capable of determining (a) the content of the message and (b) proof of receipt.

Periodically, the archives push a summary of messages delivery status to a billing database associated with network database 114. This information is retained for datamining or billing purposes.

In view of the above described system and operation of the present invention, it should be apparent that the use a virtual private network (VPN) and the geographically distributed database replaces expensive point-to-point to connections and dedicated hardware components. The present invention enables business-to-business (B2B) applications to scale from a relatively small number to unlimited trading partners. As is well understood in the art, VPNs may include the use of encryption in the lower protocol layers to provide a secure connection through an otherwise insecure network such as the Internet. VPNs are generally cheaper than real private networks using private lines but rely on having the same encryption system at both ends, a task well suited to being included in the connectors. This layer of encryption provides extra protection by encrypting the messages to prevent a listener from improperly obtaining information.

Refer again to the connector 104 shown in FIG. 2A. Since NOC 112 may be unable to monitor connectors positioned behind a firewall, the operational status of any such connector depends on either the primary and secondary route point processors to monitor and issue an alert when a non-functional connector is encountered. Accordingly, each route point processor includes a distributed agent process directed to providing hardware status information regarding both the route point processor and the associated routing processor 202 to NOC 112. These agents monitor operation and communicate to NOC 112 via the distributed communication network in real time. When NOC 112 determines a component problem associated with the network of FIG. 1, NOC 112 notifies network controller 108. In response, network controller 108 prepares re-routing information to by-pass the identified failure component and pushes this information to the route point processors and connectors.

In the event the NOC notifies the network controller of hardware problems or a congested network, network controller 108 is responsible for re-routing the network configuration. In this manner, the message delivery network 101 (FIG. 1) is re-configured in a dynamic manner. The ability to reconfigure the network to avoid a congested communication backbone ensures that message delivery network 101 operates with predictable latency consistent with the priority level associated with each message.

Referring now to FIG. 2A that illustrates a connector that is not positioned behind a firewall so that the connector appears on the network as a http proxy interface. Specifically, routing processor 202 is accessible to users via any Internet web browser 204. In this embodiment, the routing processor 202 acquires the log-in name and authenticates the password before passing messages on to the primary and secondary route point processor. Using the log-in information, the routing processor 202 first transfers the log-in data to the primary and secondary route point processor using a secure socket layer (SSL) connection. Upon receiving authorization from network controller 108, the connector is configured for the specific user associated with the browser. When security is necessary, the log-in information may be wrapped at the browser 204 in an encrypted envelope.

It should be apparent in view of the above-described embodiment that the present invention may be readily scaled to include large numbers of trading partners. Further, the present invention easily adapts to existing EDI applications in a manner than enables secure transmission of messages across the Internet with guaranteed message delivery. With the addition of the archival of messages and transmission receipts, the present system provides trading partners the ability to track message transmission receipt delivery time, as well as to obtain convenient archival of messages with the trading partners.

With reference again to FIG. 1, enhanced levels of monitoring analysis and reporting of message delivery network is provided through portal by data management network 103. Data management network includes portal 116, network controller 108, and archive database 110. A system administrator can access archive information via portal 116. Portal 116 interfaces with any standard Internet browser to enable easy access to the information contained in the archives. Alternatively, portal 116 enables an administrator to recover a specific message. Further, portal 116 provides an application programming interface (API) that enables B2B application programs to directly couple to the archives enabling analysis and monitoring of the message system performance.

While certain exemplary preferred embodiments have been described and shown in the accompanying drawings, it is to be understood that such embodiments are merely illustrative of and not restrictive on the broad invention. Further, it is to be understood that this invention shall not be limited to the specific construction and arrangements shown and described since various modifications or changes may occur to those of ordinary skill in the art without departing from the spirit and scope of the invention as claimed.

What is claimed is:

1. A method for transferring messages in a digital network, wherein the digital network includes a message source coupled to a message destination by two or more message paths, the method comprising:

sending a message from the message source to the message destination;

receiving the message at a route point, wherein the route point is a point in the digital network between the message source and the message destination;

sending the original message from the route point to the message destination along a first communication path; and sending a copy of the message from the route point to the message destination along a second communication path, wherein the second communication path is at least partially different from the first communication path;

wherein the amount of data sent to the message destination is tracked by recording information at the route point.

2. The method of claim 1, further comprising:

determining when either of the message or message copy is received by the message destination; and in response to the step of determining, preventing the non-received message from being received by the destination.

3. The method of claim 2, wherein the step of determining includes a substep of:

maintaining a record of messages that have been transferred to the message destination.

4. The method of claim 1, wherein a copy of the message is stored in an archive associated with the route point; and wherein the copy of the message is retained in the archive after the copy of the message has been forwarded to the message destination.

5. The method of claim 1, wherein an XML envelope is applied to the message.

6. In a distributed networked computer system, a process for exchanging messages in said networked computer system, said process comprising the steps of:
provic ding information to be sent from a source to a destination, said source and said destination coupled to said distributed networked computer system;
generating a message at said source, said message comprising the information and routing information;
transmitting said message to a selected route point in said distributed computer network using a first communication backbone;
transmitting said message to at least one additional selected route point in said distributed computer network using a second communication backbone;
archiving said message at each route point;
transmitting said message from each route point to said destination;
tracking the amount of data sent to said destination at each route point; and
eliminating duplicate copies of said message at said destination;
wherein said message is archived at each route point after said message has been transmitted from each route point to said destination.

7. The process as claimed in claim 6 further including the step of providing an application program interface (API) at said source to enable business to business application programs to obtain information contained in said message.

8. The process as claimed in claim 7 further including the step of providing an application program interface (API) at said destination to enable business to business application programs acquire the information contained in said message.

9. The process as claimed in claim 6 further including the steps of:
providing routing information to said source; and
associating an archive to said source.

10. The process as claimed in claim 9 wherein said step of providing routing information further includes the step of associating said source with selected route points, said associating step further including the step of updating said association in response to alerts issued by at least one of said route points.

11. The process as claimed in claim 10 wherein said step of providing routing information further includes a step of providing a network controller coupled to said distributed computer network for configuring said distributed computer network in response to said alert.

12. The process as claimed in claim 10 wherein said updating step further includes the step of providing real-time performance monitoring and management of the hardware components comprising said distributed computer network.

13. The process as claimed in claim 12 wherein said monitoring and management step further includes the step of responding to said alert.

14. The process as claimed in claim 13 further including a step of updating a database showing the operational status of each component in said distributed computer network in response to said alert, said database accessible by said network controller.

15. The process as claimed in claim 6 further including a step of generating an alert in response to detection of a failure to complete the transmission of said message from said source to said destination.

16. The process as claimed in claim 15 further including a step of updating a database in response to said failure detection and configuring said distributed computer network in response to changes to said database, said database accessible to said network controller.

17. The process as claimed in claim 16 wherein said updating and configuring step further includes a step of associating said source with selected route points, said associating step further including the step of updating said association in response to said failure detection.

18. In a networked computer system having a plurality of connectors for providing access to a network for transmitting messages between said connectors, an apparatus for managing the transmission of said messages in said networked computer system, said apparatus comprising:
means for generating messages, said generating means coupled to said network;
a first route point;
a second route point;
means for transmitting said message to said first selected route point in said distributed computer network using a first communication backbone and to said second selected route point in said distributed computer network using a second communication backbone;
means for archiving said message at each route point after said message is transmitted by such route point, said archival means associated with said route point;
means for transmitting said message from said first route point to said destination using said first communication backbone;
means for transmitting said message from said at least one additional route point to said destination using said second communication background;
means for eliminating duplicate copies of said message at said destination; and
means for recovering said information at said destination.

19. The apparatus as claimed in claim 18 wherein said means for generating messages further comprises a program interface to business to business application programs.

20. The apparatus as claimed in claim 19 wherein said means for generating messages further includes means for establishing communication between said means for generating messages and said route points.

21. The apparatus as claimed in claim 19 wherein said means for generating messages further comprises means for creating an envelope, said envelope comprising routing information and an opaque payload.

22. The apparatus as claimed in claim 19 wherein said means for generating messages further comprises means for encrypting said message.

23. The apparatus as claimed in claim 18 wherein said archival means further includes a distributed database means for archiving said message at each route point, said archival means coupled to said network.

24. The apparatus as claimed in claim 18 further including means for generating an alert, said alert generating means associated with said route point.

25. The apparatus as claimed in claim 24 further including means for responding to said alert; said alert responding means coupled to said network.

26. The apparatus as claimed in claim 25 wherein said alert responding means further including means for activating a response to said alert; said activating means coupled to said alert responding means.

27. The apparatus as claimed in claim 24 further including means for re-configuring said distributed computer network, said reconfiguring means comprising means for transmitting configuration information to said connector such that said message is transmitted to at least one route point in said distributed computer network other than said first or second route point.

28. The apparatus as claimed in claim 24 further including means for recovering said message from said archive.

29. The apparatus as claimed in claim 28 further including means for tracking receipt of messages at said destination.

30. The apparatus as claimed in claim 29 further including means for accessing said archives to acquire said message and to determine delivery information.

31. An apparatus for transmitting and tracking messages over a distributed network, comprising:
   a plurality of route points;
   a plurality of connectors, each of which coupled by said network to at least a pair of said route points; said connectors adapted to receive information and configuring said information in an envelope prior to transmitting said envelope to said route points;
   a distributed database for archiving said envelope at each route point after said envelope has been transmitted at each route point, said distributed database coupled to said route points by said network;
   a second plurality of connectors, each of which coupled by said network to at least two of said plurality of route points, said second plurality of connectors adapted to acquire said envelope from said at least two of said plurality of route points and for determining whether one of said envelope is a duplicate of an earlier received envelope;
   means for acquiring said envelope from either said route points or from said distributed database.

32. The apparatus as claimed in claim 31 further including a network controller coupled to said network.

33. The apparatus as claimed in claim 32 further including a network operations center for real-time performance monitoring of said network, said network operations adapted to respond to an alert and for updating said network manager of the operational status of each component in said distributed computer network in response to said alert.

* * * * *